Patented Apr. 10, 1923.

1,451,485

UNITED STATES PATENT OFFICE.

WILLIAM LEVIS WOOTTON, OF BROOKLYN, NEW YORK.

COMPOSITION FOR FIREPROOFING AND OTHER PURPOSES AND PROCESS OF PREPARING SAME.

No Drawing.   Application filed July 5, 1919. Serial No. 308,739.

*To all whom it may concern:*

Be it known that I, WILLIAM LEVIS WOOTTON, a citizen of the United States, and a resident of Brooklyn, Kings County, New York, have invented a certain new and useful Composition for Fireproofing and Other Purposes and Process of Preparing the Same, of which the following is a description.

My invention relates to an improved composition capable of numerous modifications and susceptible of a wide variety of uses in the arts. The composition, however, is especially adapted for use in improving certain qualities of various materials employed in the building industry, one form thereof being practically infusible and suitable for use in rendering wood, building plaster and other materials substantially fireproof. It is to be distinctly understood, however, that I do not limit myself to the use of the composition for any particular purpose.

The invention is based upon the discovery that a composition consisting of calcium chloride properly combined or mixed with one or more of certain other salts, will possess the quality specifically referred to above to a very marked degree; and my invention resides in the provision of a composition of this character and also in the process of preparing such composition.

In its preferred form my improved composition comprises an aqueous solution of a mixture of calcium chloride, sodium chloride or common salt, and a sulphate of a metal of the alkaline earth group, preferably calcium sulphate or gypsum, in which the calcium chloride greatly predominates. My composition may also be prepared in a dry state. For some uses of the composition, including the use thereof for fireproofing, good results may be obtained when either the sodium chloride or the calcium sulphate is omitted. Furthermore, the proportions of the ingredients in the composition may be varied to some extent with but slight loss of the qualities referred to. In all instances, however, the calcium chloride should predominate in the composition.

Preferably, I prepare my improved composition in the form of an aqueous solution by dissolving a mixture of slaked lime and sodium chloride or common salt in a mixture of hydrochloric and sulphuric acids, until these acids are completely neutralized.

The mixture of slaked lime and salt used is preferably in the proportion of approximately 150 parts by weight of slaked lime to one part by weight of salt, while the mixture of hydrochloric and sulphuric acids employed preferably consists of approximately 99% by volume of hydrochloric acid and one per cent by volume of sulphuric acid. These proportions, however, may be varied to a very considerable degree. The composition obtained by dissolving the described mixture of slaked lime and salt in the described mixture of hydrochloric and sulphuric acids until the latter are completely neutralized, consists of a mixture of calcium chloride, sodium chloride and calcium sulphate in the proportions of approximately 200 parts by weight of calcium chloride to one part by weight of sodium chloride and one part by weight of calcium sulphate.

The composition thus obtained is practically infusible, and cotton, textile fabrics, plaster, wood for furniture, buildings, etc. and other materials which it is desired to render fireproof, may be readily impregnated therewith.

Having now described my invention, what I claim as new and desire to protect by Letters Patent of the United States, is as follows:

1. A composition consisting of a mixture containing calcium chloride and but two other salts, namely sodium chloride and calcium sulphate, substantially as described.

2. A composition consisting of a mixture containing calcium chloride, and but two other salts, namely sodium chloride and calcium sulphate, the calcium chloride predominating in the mixture, substantially as described.

3. A composition consisting of a mixture containing calcium chloride, sodium chloride and calcium sulphate in the proportions of at least 100 parts by weight of calcium chloride to 1 part by weight of sodium chloride and 1 part by weight of calcium sulphate, substantially as described.

4. A composition consisting of a mixture containing calcium chloride and sodium chloride in the proportions of at least 100 parts by weight of calcium chloride to one part by weight of sodium chloride, substantially as described.

5. A composition consisting of a mixture containing calcium chloride, and but two other salts, namely, sodium chloride, and a sulphate of a metal of the alkaline earth group, substantially as described.

6. A composition consisting of a mixture containing calcium chloride, and but two other salts, namely, sodium chloride and a sulphate of a metal of the alkaline earth group, the calcium chloride predominating in the mixture, substantially as described.

7. The process of preparing a composition of matter which consists in dissolving a mixture of slaked lime and sodium chloride in a mixture of hydrochloric acid and sulphuric acid, substantially as described.

8. The process of preparing a composition of matter which consists in dissolving a mixture of slaked lime and sodium chloride in a mixture consisting of approximately 99% hydrochloric acid and 1% sulphuric acid, substantially as described.

9. The process of preparing a composition of matter which consists in dissolving a mixture of slaked lime and sodium chloride in a mixture of hydrochloric acid and sulphuric acid until said acids are completely neutralized, substantially as described.

10. The process of preparing a composition of matter which consists in dissolving a mixture of approximately 150 parts by weight of slaked lime and one part by weight of sodium chloride in a mixture of hydrochloric acid and sulphuric acid, substantially as described.

11. The process of preparing a composition of matter which consists in dissolving a mixture of approximately 150 parts by weight of slaked lime and one part by weight of sodium chloride in a mixture consisting approximately of 99% hydrochloric acid and 1% sulphuric acid until said acids are completely neutralized, substantially as described.

This specification signed this 2nd day of July 1919.

W. L. WOOTTON.